United States Patent
Reuter et al.

(10) Patent No.: US 7,188,710 B2
(45) Date of Patent: Mar. 13, 2007

(54) HYDRAULIC BRAKE ACTUATOR COMPRISING ELECTRICALLY ACTUABLE LOCK FOR PARK BRAKE

(75) Inventors: David F. Reuter, Beavercreek, OH (US); Gary C. Fulks, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/054,347

(22) Filed: Feb. 9, 2005

(65) Prior Publication Data

US 2005/0173206 A1   Aug. 11, 2005

Related U.S. Application Data

(60) Provisional application No. 60/542,909, filed on Feb. 9, 2004.

(51) Int. Cl.
F16D 65/32 (2006.01)

(52) U.S. Cl. .................................... 188/72.7

(58) Field of Classification Search ...... 188/71.7–72.9, 188/156
See application file for complete search history.

(56) References Cited

U.S. PATENT DOCUMENTS

| | | | | |
|---|---|---|---|---|
| 3,371,753 A | * | 3/1968 | Meier | 188/347 |
| 3,507,367 A | * | 4/1970 | Brown et al. | 188/106 F |
| 3,812,935 A | * | 5/1974 | Pringle | 188/71.8 |
| 3,874,747 A | * | 4/1975 | Case et al. | 303/89 |
| 3,983,975 A | * | 10/1976 | Wright | 188/265 |
| 4,014,414 A | * | 3/1977 | Yamamoto et al. | 188/170 |
| 4,064,973 A | * | 12/1977 | Deem et al. | 188/71.7 |
| 4,194,596 A | * | 3/1980 | Garrett et al. | 188/72.7 |
| 4,621,713 A | * | 11/1986 | Carre et al. | 188/72.7 |
| 4,784,244 A | * | 11/1988 | Carre et al. | 188/156 |
| 5,443,141 A | * | 8/1995 | Thiel et al. | 188/71.9 |
| 6,053,289 A | * | 4/2000 | Bauer et al. | 188/71.9 |
| 6,311,808 B1 | * | 11/2001 | Halasy-Wimmer et al. | 188/72.6 |
| 6,315,092 B1 | * | 11/2001 | Schwarz | 188/265 |

* cited by examiner

*Primary Examiner*—Chris Schwartz
(74) *Attorney, Agent, or Firm*—Scott A. McBain

(57) ABSTRACT

In an automotive vehicle braking system, a hydraulic brake actuator includes a wedge for locking a hydraulic piston in a brake position for purposes of applying a park brake. To apply the park brake, hydraulic pressure is increased to advance the piston to urge the brake pads against the rotor. With the piston in the brake position, an electrical solenoid is energized to advance the wedge to engage the piston. The wedge includes an inclined surface that contacts an inclined surface connected to the piston or the housing, with sufficient frictional force to maintain the wedge in the advanced position without requiring hydraulic pressure or electrical power. Thus, the park brake remains applied even when the vehicle is turned off.

15 Claims, 6 Drawing Sheets

100

HYDRAULIC BRAKE ACTUATOR COMPRISING ELECTRICALLY ACTUABLE LOCK FOR PARK BRAKE

CROSS REFERENCE TO RELATED APPLICATION

This application claims the benefit of U.S. Provisional Application No. 60/542,909, filed Feb. 9, 2004, which is incorporated herein by reference.

TECHNICAL FIELD OF INVENTION

This invention relates to a hydraulic brake actuator for an automotive vehicle. More particularly, this invention relates to such hydraulic brake actuator that includes a wedge operated by a solenoid or the like to lock the actuator for purposes of providing a park brake.

BACKGROUND OF INVENTION

In a typical automotive vehicle, a brake system includes brake pads disposed about a rotor mechanically coupled to a wheel and operated by a caliper assembly. During vehicle travel, the brake pads are spaced apart from the rotor to allow free rotation of the rotor, and thus the wheel. When stopping is desired, the caliper assembly clamps the brake pads against the rotor, creating friction that inhibits rotation of the rotor. In a conventional brake system, the assembly includes a hydraulic actuator coupled by a hydraulic line to a pedal that is depressed by the operator to engage the brake. When the pedal is depressed, the resulting increased hydraulic pressure advances a piston to apply the brake pads against the rotor.

The vehicle is also equipped with a park brake to prevent movement of the wheels when the vehicle is not in operation, such as when the vehicle is parked on an incline. A typical park brake comprises a cable linkage that mechanically connects a pedal depressed by an operator to a locking mechanism that secures the wheel. Care must be taken in routing the cable to assure smooth and reliable movement. Moreover, the pedal, linkage and locking mechanism add significant cost and weight to the vehicle. It has been proposed to use the hydraulic actuator as the park brake. However, when the vehicle is not in operation, as when the park brake is needed, the hydraulic pressure is reduced, and the actuator may not be or remain reliably engaged. As a result, to assure reliable operation, a separate mechanism generally provided for the park brake that does not rely solely upon or utilize the hydraulic actuator.

It has also been proposed to provide an electric park brake that includes a solenoid or other electromechanical device and secures the wheel independent of the hydraulic actuator. This allows the cable linkage to be replaced by a simple electrical wire. Also, it allows the park brake to be engaged by an electrical switch, as opposed to a pedal mechanism. However, in order to apply a force sufficient to clamp the brake pads against the rotor to prevent rolling of the vehicle, a relatively large electrical device is required. Also, the system must be designed to assure the park brake remains engaged despite a loss of electrical power, which might occur when the vehicle is not operating, for example, if the vehicle battery dies. These requirements increase the cost, size and complexity of an electro-mechanical park brake system.

Thus, there is a need for a brake actuator that is actuated hydraulically during vehicle operation to for purposes of stopping the vehicle, and that also may serve as a park brake by clamping the brake pads to secure the rotor, and thus the wheel, when the vehicle is not in operation. The hydraulic brake actuator used as a park brake must be reliable to maintain the brake pads engaged with the rotor with sufficient force to prevent wheel movement despite diminished hydraulic pressure when the vehicle is not operating. Moreover, it is desired that the park brake may be electrically activated, to provide a simple switch and wire connection to the operator, and, once engaged, must remain engaged even though the vehicle electrical system looses power.

SUMMARY OF THE INVENTION

In accordance with this invention, a hydraulic brake actuator is provided for a brake system, preferably an automotive vehicle brake system, that includes brake pads disposed about a rotor. The actuator comprises a hydraulic piston moveable along a piston axis between a brake applied position and a brake release position. In the brake applied position, the hydraulic piston urges the brake pads to engage the rotor, whereas in the brake release position the piston is withdrawn and the brake pads are disengaged from the rotor. The actuator also includes a wedge moveable along a wedge axis perpendicular to the piston axis. The wedge moves between an advanced position for applying the park brake, and a withdrawn position for releasing the park brake. The wedge includes an inclined wedge surface, whereas the actuator includes an inclined wedge-contact surface disposed along the piston axis adjacent the path of the wedge along the wedge axis. The inclined surfaces are oriented at an acute angle relative to the wedge axis and are parallel to maximize surface-to-surface contact when engaged. The wedge-contact surface engages the inclined wedge surface in the advanced position with sufficient frictional force to secure the wedge in the advanced position, but is spaced apart form the wedge in the withdrawn position. The actuator further includes an electrical actuator for moving the wedge to the advanced position, such as an electrical solenoid having a plunger either connected to the wedge or disposed to engage an end of the wedge.

During normal vehicle operation, the wedge is in the withdrawn position, so that the hydraulic piston is able to advance in response to applied hydraulic pressure to the brake application position to urge the brake pads against the rotor, thereby braking the vehicle, and to return to the brake release position, thereby releasing the brake, without interference by the wedge. When it is desired to apply the park brake, the hydraulic pressure is increased to advance the hydraulic piston to the brake application position. With the piston in the brake application position, the electrical actuator is energized to advance the plunger and thereby advance the wedge into the advanced position, wherein the inclined wedge surface engages the inclined wedge-contact surface, thereby locking the piston in position with the brakes applied. Frictional forces between the inclined surfaces maintain the wedge in the advanced position despite a drop in hydraulic pressure and an interruption of electrical power, as when the vehicle is turned off. Optionally, the actuator may include a detent assembly to engage an end of the wedge to prevent return to the withdrawn position, thereby further assuring that the park brake remains applied. Thereafter, when it is desired to release the park brake, hydraulic pressure is increased to relieve the frictional forces between the inclined surfaces, whereupon the wedge is returned to the withdrawn position, for example, by a compression spring.

By securing the wedge in the advanced position, the hydraulic piston is prevented from retracting and so locks the brake pads against the rotor with effective brake force to provide a reliable park brake. The hydraulic piston is locked in position without hydraulic pressure or electrical power, so that the park brake is reliable even after the vehicle is turned off. Moreover, this invention takes advantage of the hydraulic piston and other components already provided in common braking systems, and combines the functions for the park brake. Also, the invention allows the park brake to be electrically applied, by means of a switch and a connection to the vehicle electrical system, thereby eliminating the need for a cable linkage and a pedal mechanism. Still further, the electrical actuator is required only to advance the wedge and does not apply brake force. As a result, the size and cost of the braking system is reduced, without compromising the reliability of the park brake function.

BRIEF DESCRIPTION OF DRAWINGS

This invention will be further described with reference to the accompanying drawings in which.

DETAILED DESCRIPTION OF INVENTION

Figure 1:
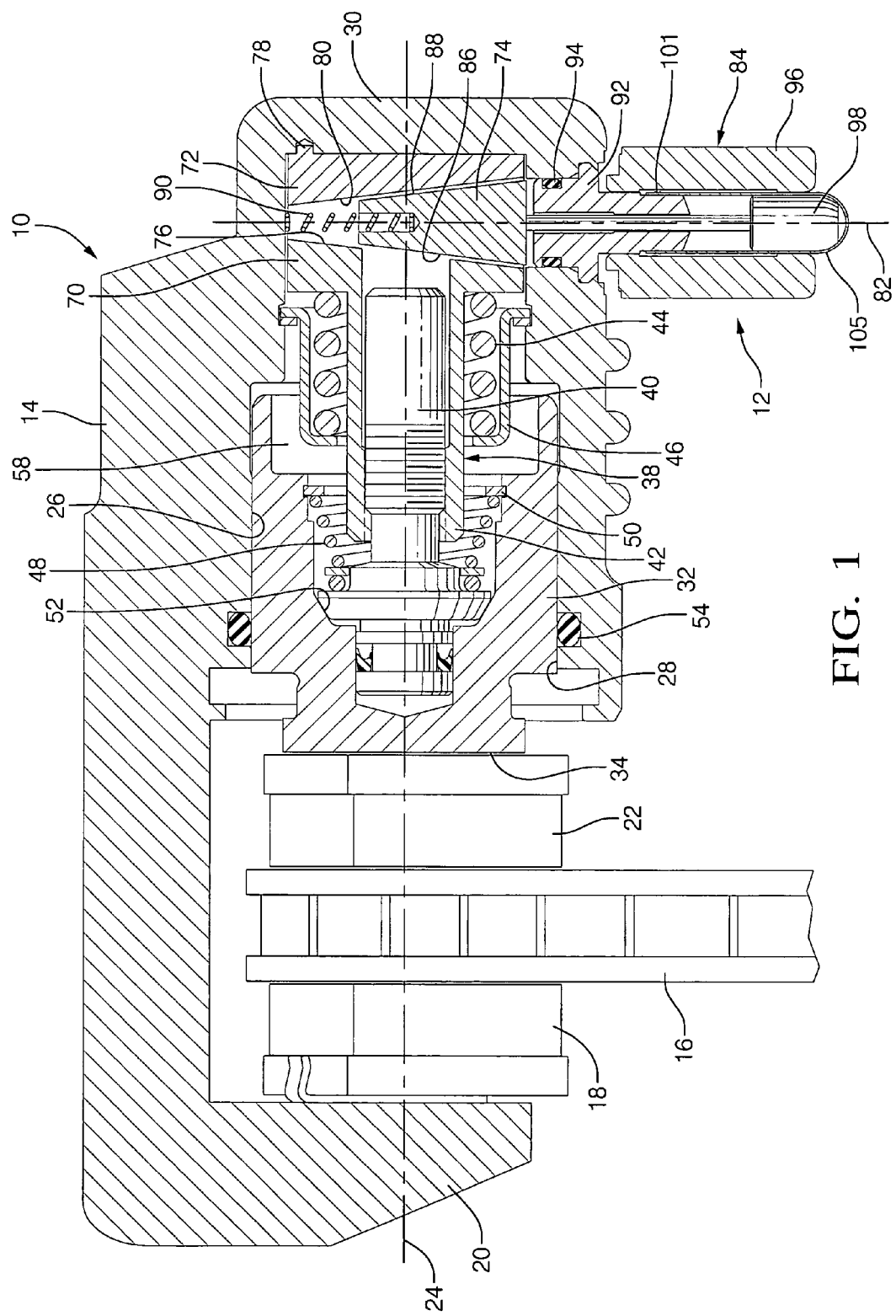
FIG. 1 is a longitudinal cross-sectional view of a hydraulic brake actuator having an electrically actuable park brake in accordance with this invention, wherein the hydraulic brake actuator is in the brake release state.
Figure 2:
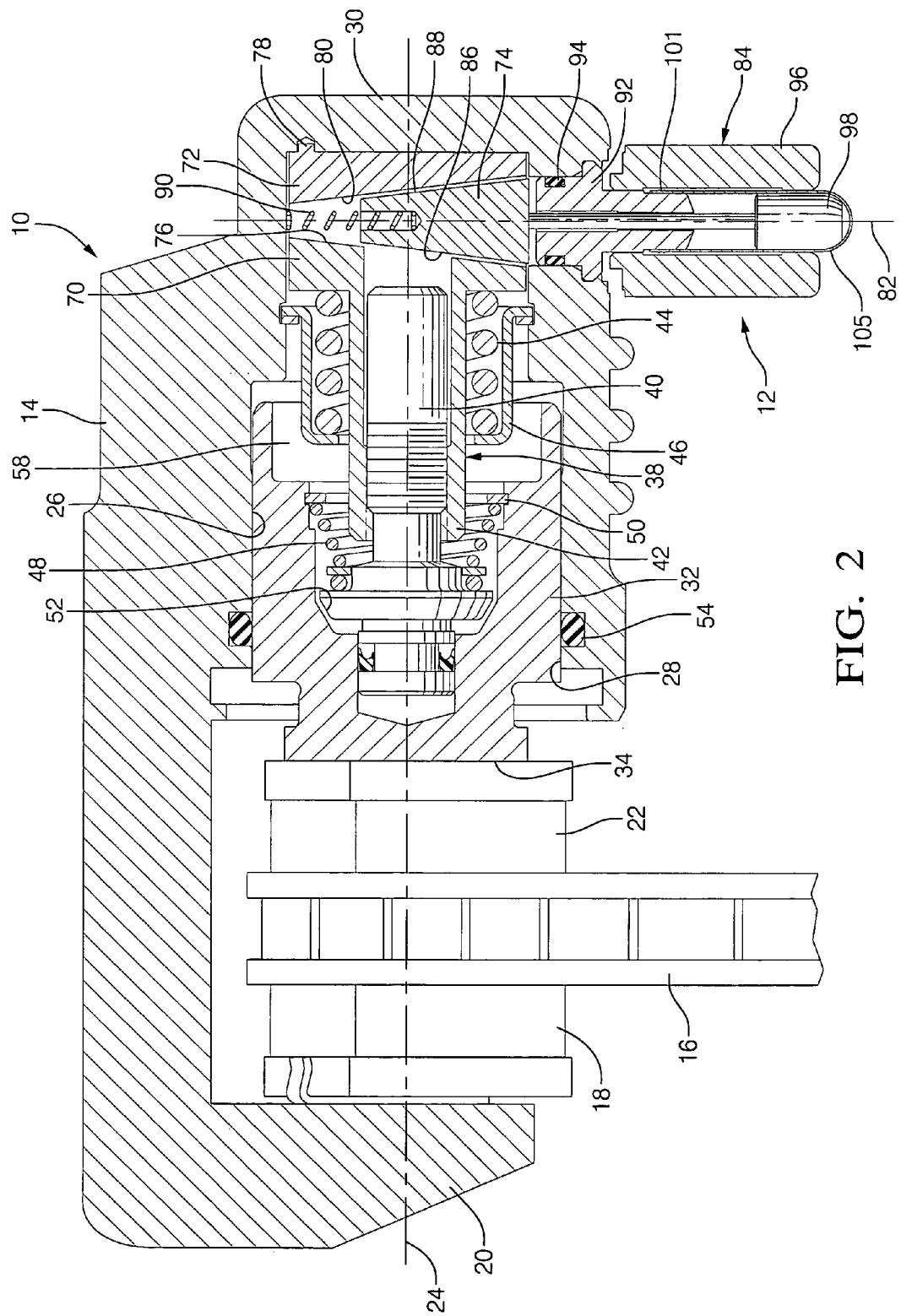
FIG. 2 is a cross-sectional view of the hydraulic brake actuator in FIG. 1, showing the hydraulic brake actuator applying the brake during vehicle stopping, with the park brake disengaged.

In accordance with a preferred embodiment of this invention, referring to FIGS. 1 through 4, a hydraulic brake actuator 10 having an electrically actuable lock assembly 12 is provided for a braking system of an automotive vehicle, wherein lock assembly 12 is adapted to lock actuator 10 when the vehicle is not in operation to secure the vehicle wheel and thereby provide a park brake. Actuator 10 comprises a metal caliper housing 14 that is mounted adjacent a wheel of the vehicle, preferably a rear wheel. To apply the brake, the actuator engages a rotor 16 mounted to the hub of the wheel and rotating therewith. The braking system is of the type referred to as a caliper assembly and includes an outer brake pad 18 mounted to a caliper arm 20 of housing 14 and an inner brake pad 22 that is mounted to the vehicle chassis opposite brake pad 18, such that pads 18 and 20 are disposed about rotor 16 and move along an axis 24 in opposed directions to apply or release the brake, in a conventional manner. During normal vehicle travel, pads 18 and 22 are spaced apart from rotor 14 as shown in FIG. 1 to allow the rotor to rotate freely with the wheel, without interference. For stopping, when hydraulic pressure within the braking system is increased in response to a pedal depressed by an operator, actuator 10 urges pads 18 and 22 about against rotor 16, as shown in FIG. 2, creating friction between the pads and the rotor. In accordance with this invention, when the park brake is engaged, actuator 10 urges the pads against the rotor in the position shown in FIG. 2 and is locked by lock assembly 12 to prevent the pads from releasing from the rotor.

Housing 14 defines a hydraulic cavity 26 having an opening 28 adjacent brake pad 22 and a closed end 30 axially apart from the opening. A hydraulic piston 32 is received in cavity 26 and is slidable along axis 24, referred to herein as the piston axis. Piston 32 includes a front end 34 that engages pad 22 to urge the pad against the rotor during braking. A seal 54 is provided between the piston and the housing. A brake adjuster mechanism 38 extends into a cavity within the piston. Mechanism 38 comprises an adjuster screw 40 that is screwed within a slidable sleeve 42 and includes a beveled surface 52 in contact with the piston. At the housing end, sleeve 42 is biased by a coil spring 44 against a retaining cup 46 secured to housing 14. At the piston end, adjustment screw 40 is biased by a spring 48 held by a locking ring 50 received in a groove in the cavity wall.

Housing 14 and piston 32 cooperate to define a hydraulic chamber 58, which is coupled to a hydraulic line (not shown) of the braking system. When the brake is applied, a brake pedal is depressed by the operator to increase hydraulic pressure within the braking system, including within chamber 58. The increased hydraulic pressure drives piston 32 and adjuster screw 40 forward along axis 24 to engage brake pad 22. Concurrently, a reaction force moves housing 14 rearward along axis 24 to urge brake pad 18 against rotor 16. During piston advance, contact is maintained between beveled surface 52 and the mating surface of piston 32. To release the brakes, the operator releases the pedal to relieve hydraulic pressure within the braking system. Spring 44, which is compressed during the piston advance, expands to return sleeve 42 to the brake release position. Piston 32 is returned to the brake release position by seal 54, which is designed to flex during the advance. During the return, in the event of brake pad wear, adjuster screw 40 is rotated relative to sleeve 42 to maintain beveled surface 52 against the mating piston surface, thereby adjusting the retracted position of sleeve 42. It will be appreciated that piston 32 and adjuster mechanism 38 (except moveable wedge plate 70) is a conventional design. For purposes of the preferred embodiment of the present invention, it is significant that the axial spacing between slidable mount 42 and closed end 30 of housing 14 is substantially constant between braking cycles, i.e., the distance in the brake applied position in FIG. 2 is maintained constant, and the distance in the brake release position shown in FIG. 1 is maintained constant, although less than the distance when the brakes are applied.

Figure 4:
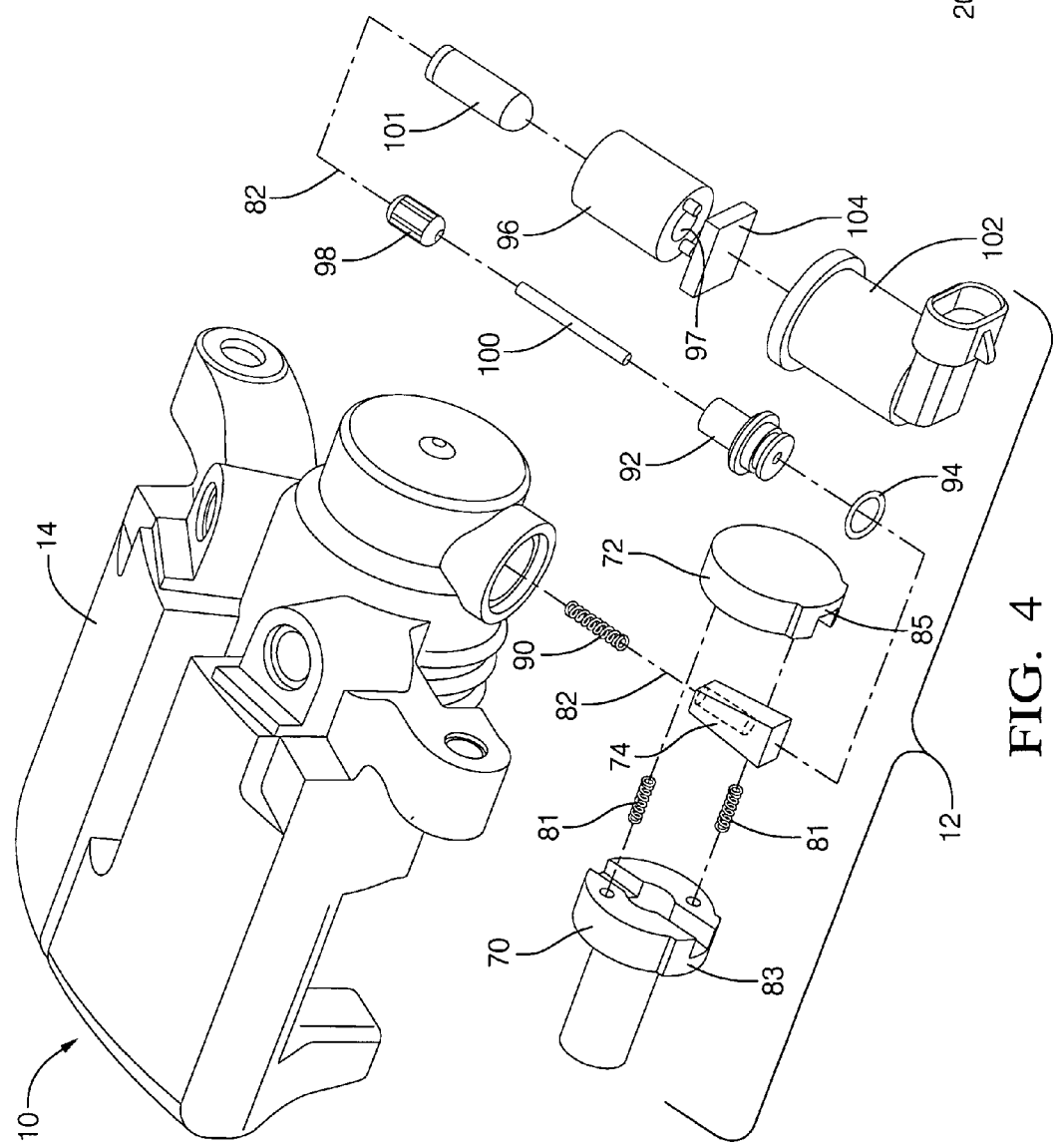
FIG. 4 is an exploded view showing components of the electrically actuable park brake.

In accordance with this invention, lock assembly 12 comprises a moveable wedge plate 70 axially spaced apart from a stationary wedge plate 72, and a wedge 74 disposed therebetween. In the preferred embodiment, moveable wedge plate 70 is integrally formed with sleeve 42 and includes an inclined surface 76. It is pointed out that moveable wedge plate 70 is operatively connected, through adjuster mechanism 38, to piston 32 so as to move in conjunction with the piston between the brake release position and the brake applied position. Alternately, moveable wedge 70 may be a discrete element not part of the adjuster mechanism, and suitably coupled to the hydraulic piston. Stationary wedge plate is positioned abutting closed end 30 of housing 14, with a tab 78 received in a slot in the housing end, and includes an inclined surface 80. Alternately, the closed end may be machined with the desired inclined surface as a single element. A pair of springs 81, shown in FIG. 4, are diametrically disposed between wedge plates 70 and 72 about wedge 74 to urge the wedge plates apart. Also, plates 70 and 72 preferably include protrusions 83 and 85, respectively, shown in FIG. 4, received in corresponding slots in cavity 26 to prevent circumferential rotation.

Figure 3:
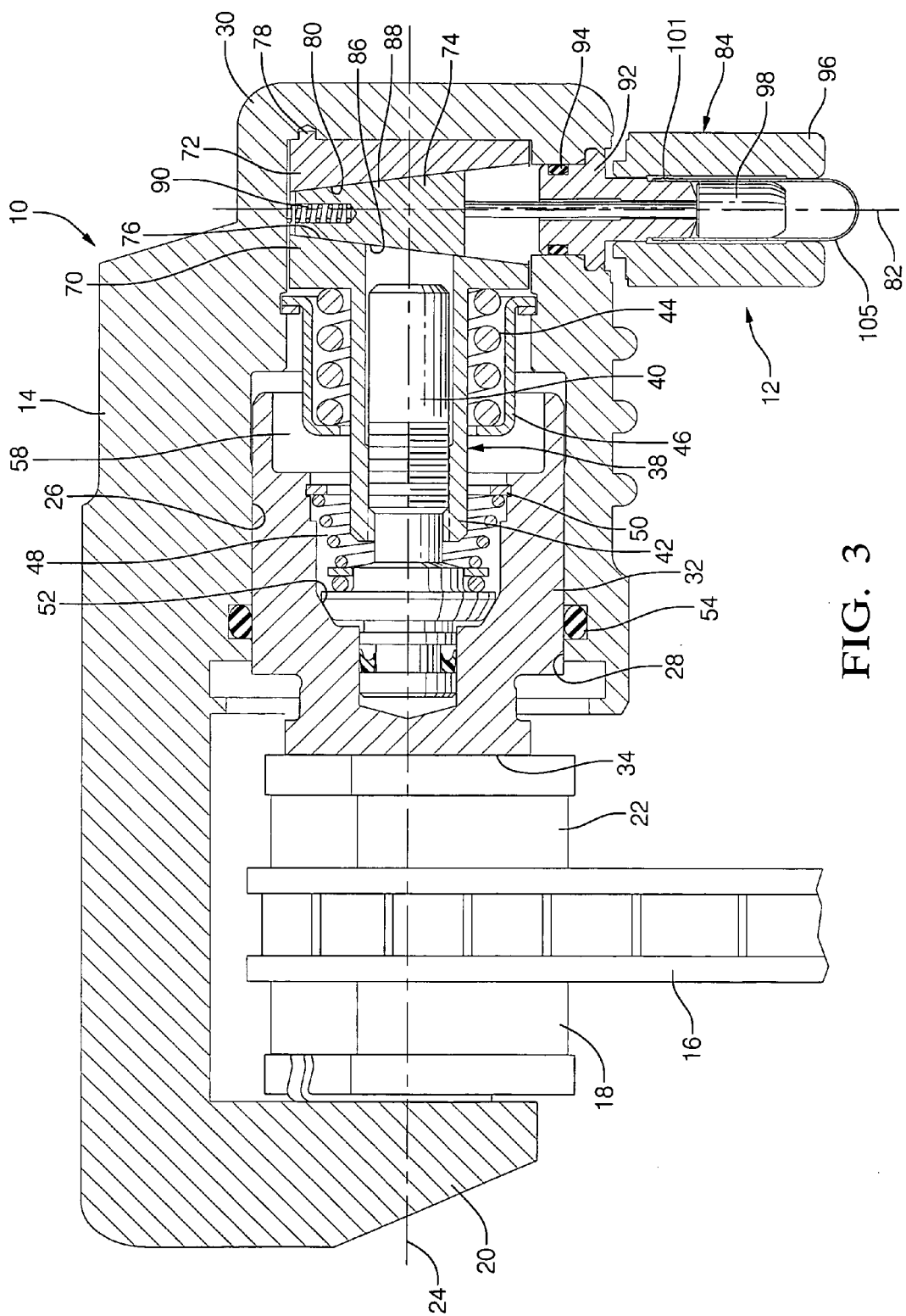
FIG. 3 is a cross-sectional view of the hydraulic brake actuator in FIG. 1, showing the hydraulic brake actuator with the park brake engaged.

Wedge 74 is moveable along axis 82, referred to as the wedge axis, which is perpendicular to axis 24, by a solenoid actuator 84 between a withdrawn or park brake release position shown in FIGS. 1 and 2, and an advanced or park brake engaged position shown in FIG. 3. It is pointed out that wedge plates 70 and 72 are disposed adjacent the path of wedge 74, with inclined surfaces 76 and 80 about wedge axis 82 and facing the wedge. Wedge 74 includes a front inclined surface 86 adjacent inclined surface 76 of moveable wedge plate 70, and a rear inclined surface 88 adjacent inclined surface 80 of stationary wedge plate 72. With wedge 74 in the retracted position, surfaces 76 and 86 and surfaces 80 and 88 are spaced apart, as shown in FIGS. 1 and 2. When wedge 74 is in the advanced position to lock actuator 10 to apply the park brake, surface 86 engages surface 76, and surface 88 engages surface 80. A coil spring 90 between wedge 74 and the circumferential wall of housing 14 axially biases the wedge in the retracted or park brake release position, and is compressed by movement of the piston to the advanced position.

Solenoid 84 is mounted to housing 14 by mount 92, with a seal 94 therebetween to prevent leakage of hydraulic fluid, and is protected by a cover 102. Referring to FIGS. 1–4, solenoid 84 includes a field coil element 96 comprising an electrical coil (not shown) encased within a polymeric housing, which is assembled with a circuit board 104 for regulating current to the field coil. Field coil 96 defines a bore that is sealed by a closed end tube 105. A plunger 98 is slidably received in tube 105 and is connected to wedge 74 by extension rod 100. In response to an applied electrical field, plunger 98 moves axially from a retracted position shown in FIG. 1, wherein the wedge is also retracted and the park brake is not engaged, to an advanced position in FIG. 3, wherein the wedge is lodged against wedge plates 70 and 72 to engage the park brake.

The operation of actuator 10 to apply the stopping brake during normal vehicle driving and also to apply the park brake in accordance with this invention will now be described. Initially, actuator 10 is in the brake release position shown in FIG. 1, wherein piston 32 is withdrawn relative to housing 14 and wedge 74 is retracted. In the brake release position, brake pads 18 and 22 are spaced apart from rotor 16 to permit the rotor to rotate without interference, so that the wheel rotates freely. For stopping, the operator depresses the brake pedal, resulting in increased hydraulic pressure in the braking system, including within chamber 58. In response to the increased hydraulic pressure, piston 32 advances forward along axis 24, and housing 14 concurrently moves rearward, thereby causing brake pads 18 and 22 to clamp about rotor 16, as shown in FIG. 2. As described above, upon release of the brake pedal, the hydraulic pressure is reduced, whereupon piston 32 and housing 14 return to the position in FIG. 1.

To engage the park brake, the hydraulic pressure is increased in chamber 58 to clamp brake pads 18 and 22 about the rotor, as in FIG. 2. This is preferably accomplished by an electrical pump of a controlled brake hydraulic modulator within the braking system in response to a switch actuated by the operator. Alternately, the operator may increase the brake pressure by depression of the brake pedal. With the piston advanced, movement of moveable wedge 70 increases the spacing relative to stationary wedge 72 along axis 24. Electrical current applied to field coil 96 causes plunger 98 to advance from the retracted position in FIG. 2 to the advanced position in FIG. 3, thereby advancing wedge 74 to engage wedge plates 70 and 72 and applying the park brake. It is pointed out that the hydraulic pressure of the fluid at opposite ends of wedge 74 and within solenoid valve actuator 12 is equivalent, so that the hydraulic pressure is balanced. As a result, the increased hydraulic pressure does not produce a net force on the wedge, so that the force required by the solenoid to advance the wedge is only required to overcome spring 90, thereby permitting the size of the solenoid to be minimized. After wedge 74 is advanced to engage plates 70 and 72, the hydraulic pressure may be relieved, whereupon the wedge prevents the piston from returning to the brake release position in FIG. 1. Also, with the wedge secured, electrical current to the solednoid may be terminated without releasing the park brake. In this manner, the brake pads remain engaged against the rotor to prevent rotation of the wheel, thereby providing an effective park brake.

In a typical vehicle, the hydraulic pressure is relieved when the vehicle is not in operation, as when the vehicle is parked and the engine is turned off. Moreover, for safety reasons, it is desired to assure that the park brake remains engaged even though the hydraulic pressure is relieved. It is a feature of the preferred embodiment of this invention that wedge 74 is and remains firmly wedged between plate 70 and plate 72 when the park brake is engaged. This is accomplished in the preferred embodiment by machining the angle of the inclined surfaces at an acute angle suitable to prevent slippage to the wedge over the and wedge plates despite a reduction of hydraulic pressure in chamber 58 and a discontinuance of electrical current to solenoid 84. Wedge 74 and plates 70 and 72 are preferably formed of steel or other metal that resists wear and provides a coefficient of friction for purposes of locking the wedge in position. For steel, in general, it is believed that an angle of the inclined surfaces relative to axis 82 of between about 5 and 8 degrees is suitable to retain the wedge in park brake position, with an optimum being about 7 degrees.

To release the parking brake, electrical power to solenoid actuator 12 is not turned off. Because of the self-locking feature of the wedge between the plates, the current is preferably turned off soon after the park brake is engaged, so as not to draw current during an idle period when the vehicle is parked, which might otherwise reduce the battery power available to restart the vehicle engine. With the solenoid deactivated, the hydraulic pressure in chamber 58 is increased to a value slightly greater than the initial pressure when the park brake was applied. This relieves the axial force, thereby reducing or eliminating friction between the inclined surfaces. Preferably, the increased pressure may be sufficient to move wedge 74 and plates 70 and 72. As a result, spring 90, which was contracted when the wedged advanced, expands to return the wedge to the retracted position, thereby disengaging the park brake. The hydraulic pressure is then relieved to return the actuator to the operating position in FIG. 1, whereupon the vehicle is ready for travel.

Thus, this invention provides a hydraulic brake actuator that is suited for use in a conventional hydraulic braking system for stopping during typical vehicle operation, and that is modified to apply a park brake when the vehicle is parked. By utilizing components of the hydraulic brake actuator for the park brake, the actuator of this invention allows the number of components to be minimized. Moreover, the park brake is positively latched by an electrical means, is connected to the vehicle electrical system through electrical wire and is activated by an electrical switch. As a result, this invention reduces the size, weight and cost of the park brake relative to separate pedal and cable linkage commonly found in vehicles. While in the described embodiment the wedge comprises two inclined surfaces, the actuator may be suitably modified to include a wedge having a single inclined surface that engages an inclined surface of either the stationary or moveable wedge plate, that is, with the opposite surfaces perpendicular to the wedge axis.

Figure 5:
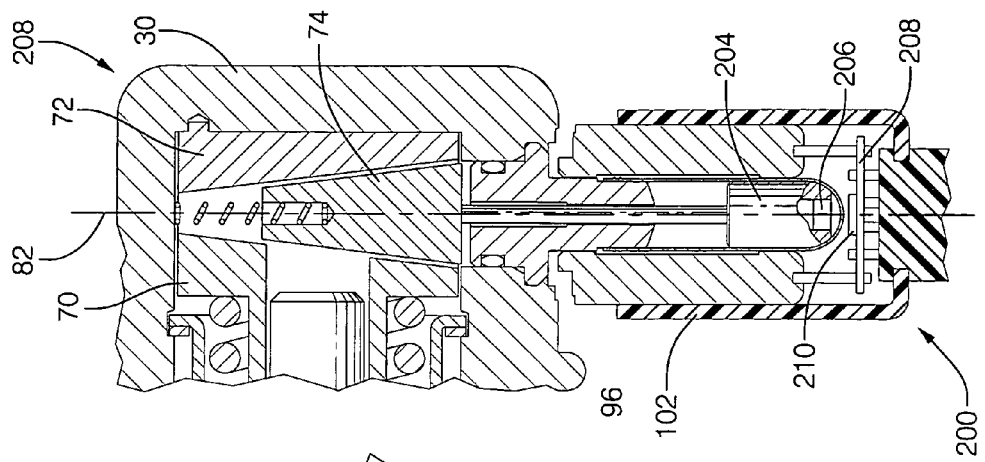
FIG. 5 is a cross-sectional view of portion of the hydraulic brake actuator in FIG. 1 showing a sensing detail thereof.

Referring now to FIG. 5, there is depicted a solenoid assembly 200 having an electronic park brake sensor in accordance with an alternate embodiment of a hydraulic brake actuator 202 of this invention. In FIG. 5, like numerals designate elements shown in FIGS. 1–4. In this embodiment, plunger 204 comprises a magnet 206. Circuit board 208 is similar to circuit board 104 in FIG. 4 for making electrical connections to field coil 96, but also includes a magnetic field sensor 210, preferably a Hall effect sensor, which is electrically coupled to a remote control unit. Sensor 210 provides an electrical signal that is a function of the proximity of magnet 206. Thus, when plunger 204 is advanced by solenoid 96 to drive wedge 74 into contact with wedge plates 70 and 72, sensor 210 measures a diminished magnetic field due to magnet 206. In this manner, the control unit may confirm that the park brake has been engaged, and may optionally activate an indicator light on the instrument panel to so advise the operator. Thereafter, when the wedge is retracted, the proximity of the magnet is sensed by sensor 210, and confirms to the control unit that the park brake has been disengaged. In this manner, the control unit may prevent operation of the vehicle while the park brake is engaged, or inform the operator that the park brake is not suitably released.

Figure 6:
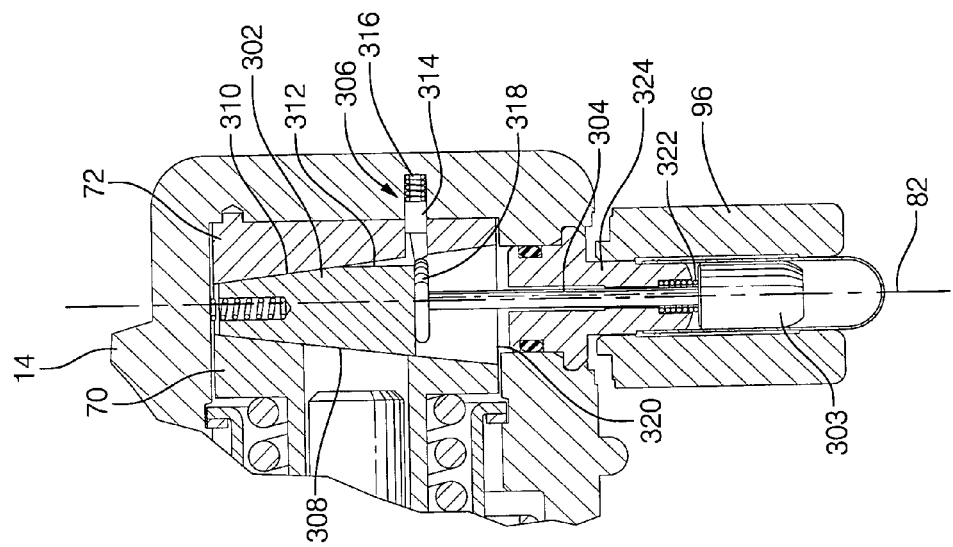
FIG. 6 is a cross-sectional view of an hydraulic brake actuator in accordance with an alternate embodiment of this invention.
Figure 7:
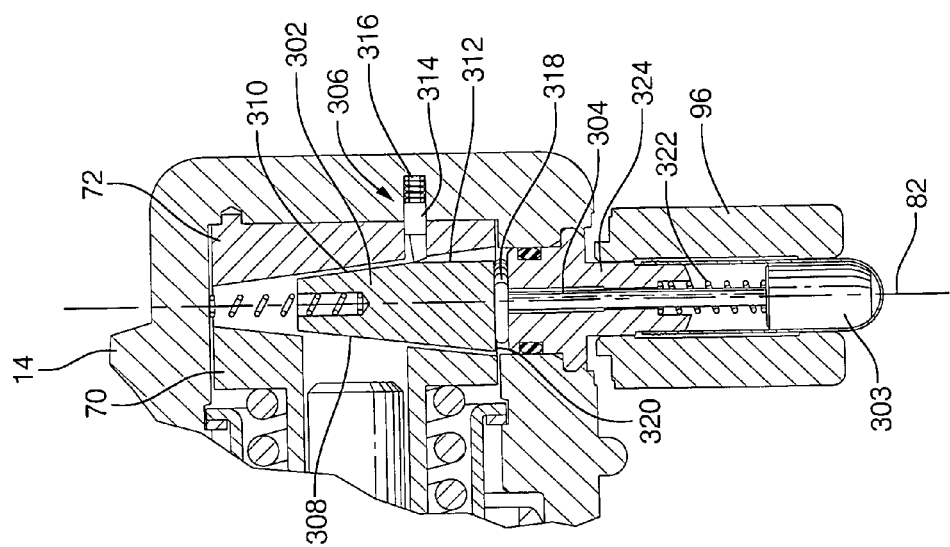
FIG. 7 is a cross-sectional view of a hydraulic brake actuator in accordance with another alternate embodiment of this invention.
Figure 8:
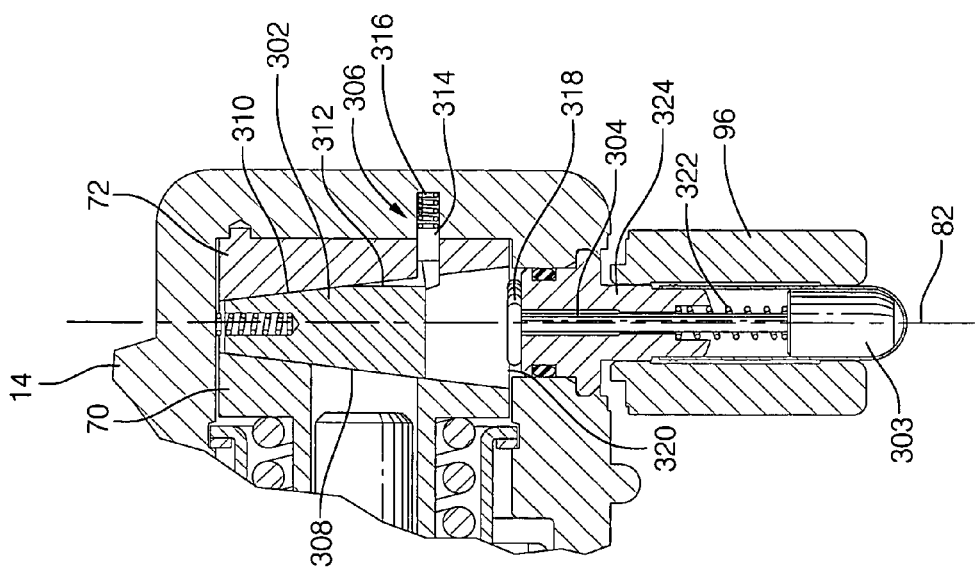
FIG. 8 is a cross-sectional view of a portion of the hydraulic brake actuator in FIG. 7 showing the arrangement when the parking brake is engaged.

Referring now to FIGS. 6–8, there is depicted an actuator 300 in accordance with another embodiment of this invention, with like numerals designating similar elements to FIGS. 1–4. Actuator 300 comprises a wedge 302 and a plunger 303 having an extension 304 that is not joined to the wedge, so that the wedge and plunger are distinct elements capable of independent movement. It is a feature of this embodiment that, when the park brake is engaged, wedge 302 is retained in position by a detent assembly 306, whereupon plunger 304 may be returned to the retracted position.

Wedge 302 comprises an inclined surface 308 for engaging the inclined surface of wedge plate 70, and an inclined surface 310 for engaging the inclined surface of wedge plate 72. Wedge 302 also includes an axial surface 312 to facilitate movement of the wedge past the detent assembly. Detent assembly 306 comprises a detent 314 slidably received in a bore in wedge plate 74 and housing 14 and biased by a spring 316. Extension 304 comprises a flat head 318 that engages end surface 320 of wedge 310. A spring 322 is provided between plunger 303 and mount 324 to bias plunger 303 in the retracted position in the absence of an applied electric field within the solenoid assembly.

To apply the park brake, the hydraulic pressure is increased to advance the piston to engage one brake pad, and to cause the housing to engage the opposite brake pad, as described above for FIGS. 1–3. FIG. 6 shows the arrangement prior to actuation of the park brake, which also corresponds to the arrangement during normal braking. Electric current is applied to electric coil 96, whereupon plunger 303 moves along axis 82 from the retracted position shown in FIG. 6 to the advanced position shown in FIG. 7. As the plunger advances, flat head 318 engages wedge 302 to push the wedge forward, so that the inclined surfaces engage the mating surfaces of the wedge plates 70 and 72 and are held by frictional forces. As end surface is advanced to clear detent 314, spring 316 advances the detent, so that the detent is positioned against the end surface, as shown in FIG. 8. Coil 96 is de-energized, whereupon spring 322 returns plunger 303 and extension 304 to the retracted positions. FIG. 8 shows the arrangement when the park brake is engaged, with wedge 302 positioned against wedge plates 70 and 72 and secured by detent 314. The detent retains the wedge despite a drop in hydraulic pressure and discontinuance of electric power, so that the park brake is applied when the vehicle is turned off.

To release the park brake, coil 96 is energized to advance plunger 303 to position head 318 against end surface 320 of wedge 302. Head 318 extends laterally beyond surface 312 and urges detent 314 from under end surface, so that detent is retracted within the bore in wedge plate 74 past surface 312. The hydraulic pressure is increased, thereby relieving the frictional forces between the inclined surfaces of wedge 302 and the wedge plates 72 and 74. The coil is de-energized, whereupon plunger 303 and wedge 302 are moved concurrently to the retracted position.

Figure 9:
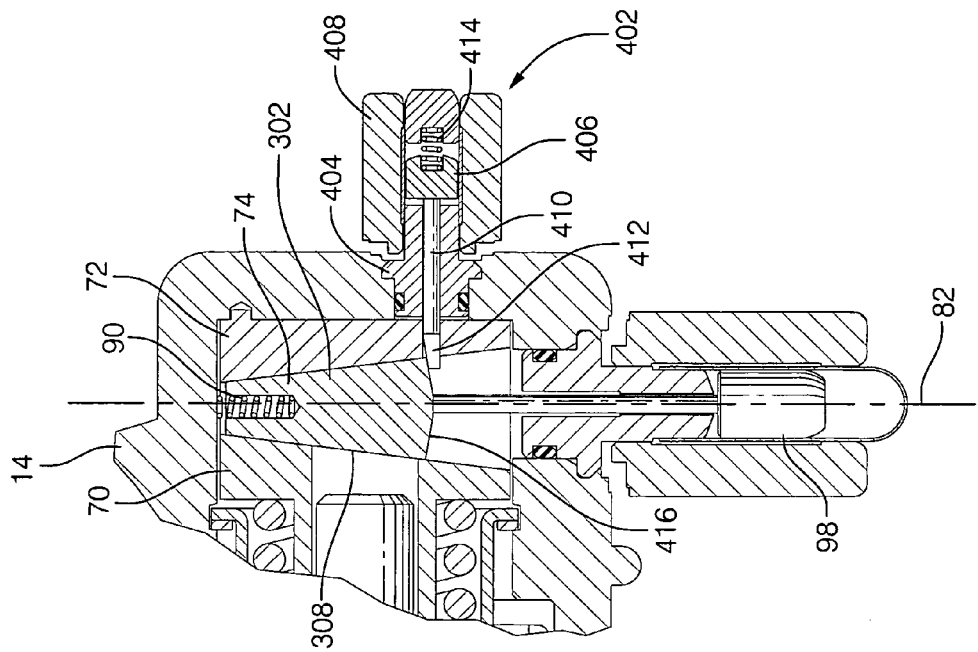
FIG. 9 is a cross-sectional view of a hydraulic brake actuator in FIG. 7 in accordance with another alternate embodiment of this invention.

Referring now to FIG. 9, there is depicted an actuator 400 in accordance with another embodiment of this invention, with like numerals referring to corresponding elements in FIGS. 1–3. In comparison to the embodiments described above, actuator 400 comprises an electrically actuable detent assembly 402. Assembly 402 is mounted to the closed end of housing 14 by a mounting member 404 and includes a solenoid comprising a plunger 406 slidably received in an electrical coil 408. Plunger 406 includes an extension 410 that extends through a slot in wedge plate 74 and has an end 412. A spring 414 biases the plunger in the forward position shown in FIG. 9, wherein the park brake is applied. Detent end 412 is positioned against an end 416 of wedge 74, thereby assuring that the wedge remains secure, and the park brake remains applied, despite loss of hydraulic pressure and electric power when the vehicle is turned off. To release the park brake, the hydraulic pressure is increased to relieve frictional forces between the wedge and the adjacent wedge plates, and an electric current is applied to solenoid coil 408 to retract plunger 406 and withdraw detent end 412 form wedge end 416, whereupon coil 90 expands to axially move wedge 74 and plunger 98 into the retracted position.

While this invention has been described in terms of the preferred embodiments thereof, it is not intended to be so limited, but rather only to the extent set forth in the claims that follow.

We claim:

1. A hydraulic brake actuator for an automotive brake system comprising a rotor and brake pads adapted to engage the rotor for braking, said hydraulic brake actuator comprising:

a housing defining a cavity having an open front end and a closed rear end;

a hydraulic piston slidably received in said cavity and cooperating with the housing to define a hydraulic chamber, said piston being moveable along a piston axis in response to hydraulic pressure with said hydraulic chamber between an brake application position wherein the piston urges the brake pads to engage the rotor and a brake release position wherein the piston is withdrawn to disengage the brake pads from the rotor;

a stationary wedge plate adjacent the closed rear end of the housing and having an inclined surface facing the hydraulic piston;

a moveable wedge plate operatively coupled to the hydraulic piston for movement concurrently therewith and having an inclined surface facing the stationary wedge plate spaced apart therefrom;

a wedge moveable along a wedge axis perpendicular to the piston axis between an advanced position and a withdrawn position, said wedge having a first inclined wedge surface adapted to engage the inclined surface of the moveable wedge plate when in the advanced position and a second inclined surface adapted to engage the inclined surface of the stationary plate when in the advanced position, said first inclined surface and said second inclined surface extending at an acute angle relative to the piston axis, said wedge comprising an end; and an electrical solenoid assembly comprising a plunger moveable in response to an applied electric field and adapted to move the wedge along the wedge axis between the withdrawn position and the advanced position;

whereby when the hydraulic piston is in the brake application position, the electrical solenoid assembly is actuable to advance said wedge to said advanced position, whereupon said inclined wedge surface engages the inclined surface of the moveable wedge plate and said second inclined wedge surface engages the inclined surface of the stationary plate to prevent movement of the hydraulic piston to the brake release position;

said hydraulic brake actuator further comprising a detent assembly that includes a detent positioned to engage the end of said wedge when said wedge is in the advanced position and retractable to release said wedge for return to said withdrawn position.

2. A hydraulic brake actuator in accordance with claim 1 wherein the electrical solenoid assembly comprises an electrical coil and a plunger disposed within said electrical coil and moveable in response to an electric field created by electrical current through said electrical coil.

3. A hydraulic brake actuator in accordance with claim 2 wherein the plunger is connected to the wedge.

4. A hydraulic brake actuator in accordance with claim 2 wherein the wedge comprises an end, and wherein the plunger comprises a head that engages the end to urge the wedge into the advanced position and separates from the wedge to retract apart from the wedge.

5. A hydraulic brake actuator in accordance with claim 1 further comprising a sensor for detecting the wedge in the in the withdrawn position.

6. A hydraulic brake actuator in accordance with claim 5 wherein the plunger comprises a magnet, and wherein the sensor is a Hall effect sensor is located within the electrical solenoid assembly for detecting the position of the magnet.

7. A hydraulic brake actuator in accordance with claim 1 further comprising a spring for biasing said wedge relative to said housing in said withdrawn position.

8. A hydraulic brake actuator in accordance with claim 1 further comprising an adjuster mechanism disposed between the hydraulic piston and the closed rear end of the housing and comprising a sleeve, and wherein the moveable wedge plate is joined to the sleeve.

9. A hydraulic brake actuator in accordance with claim 1 wherein the acute angle is between 4 and 8 degrees.

10. A hydraulic brake actuator in accordance with claim 1 wherein said detent assembly is mounted through a bore in said stationary plate.

11. A hydraulic brake actuator in accordance with claim 1 wherein the detent assembly comprises a spring for biasing the detent to engage the end of said wedge.

12. A hydraulic brake actuator in accordance with claim 1 wherein the plunger comprises a head to urge said detent from a position engaging the end of the wedge to a position lateral of the end, thereby releasing the wedge from the advanced position.

13. A hydraulic brake actuator in accordance with claim 1 wherein the detent assembly comprises a solenoid assembly comprising an electric coil and a plunger disposed within the coil and connected to said detent, said plunger being retractable in response to an electric current applied to the coil to retract said detent and thereby release the wedge.

14. A hydraulic brake actuator in accordance with claim 1 wherein the first inclined wedge surface is disposed at an angle between about 5 and 8 degrees relative to the wedge axis.

15. A hydraulic brake actuator in accordance with claim 1 wherein the second inclined wedge surface is disposed at an angle between about 5 and 8 degrees relative to the wedge axis.

* * * * *